Nov. 7, 1967 TAKASHI OGURA ET AL 3,350,905
LIQUID PRESSURE BULGE FORMING APPARATUS
Filed Sept. 4, 1964 4 Sheets-Sheet 1
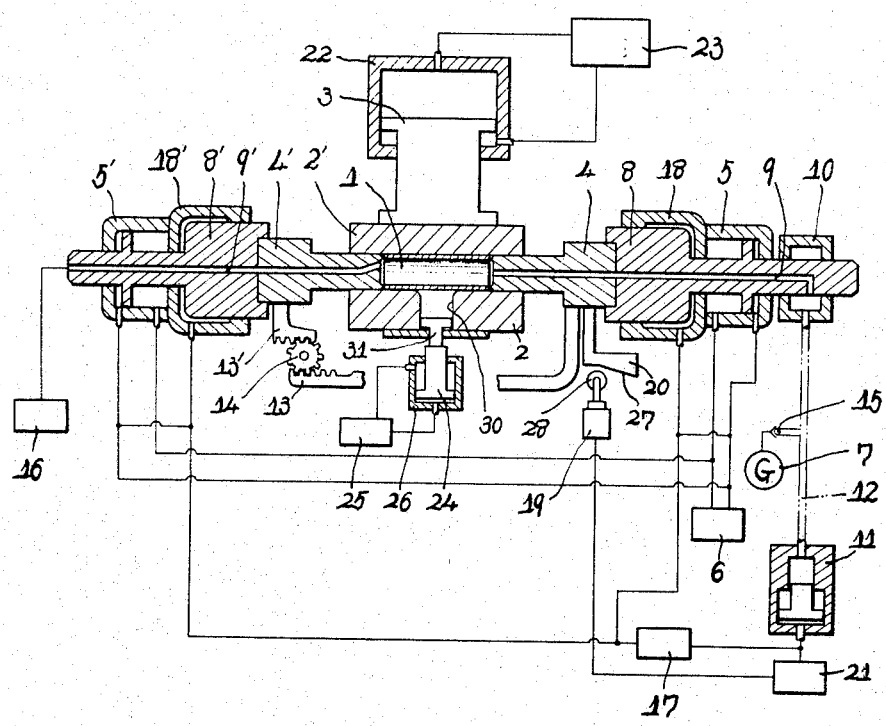
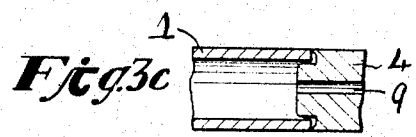
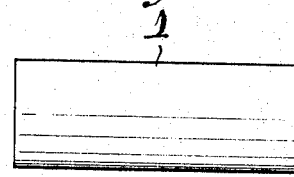
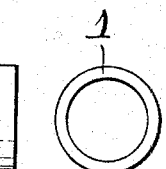
INVENTOR
Takashi Ogura
Fumio Ikeda
BY Keiichi Yamada
Ernest Montague
Attorney

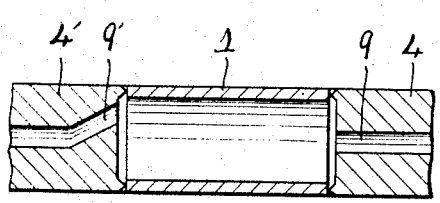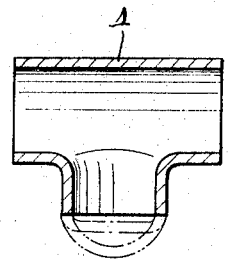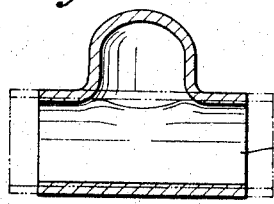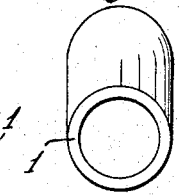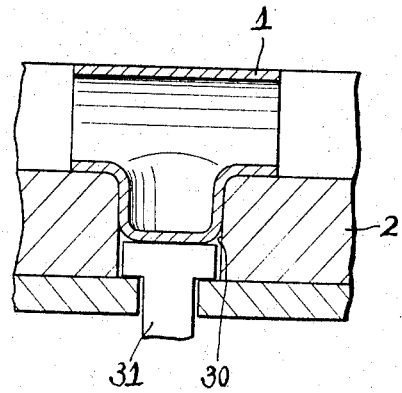

Nov. 7, 1967   TAKASHI OGURA ET AL   3,350,905
LIQUID PRESSURE BULGE FORMING APPARATUS
Filed Sept. 4, 1964                     4 Sheets-Sheet 4
Fig. 11
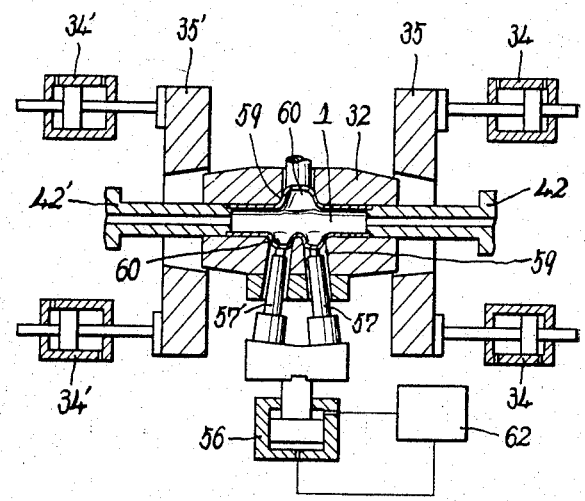
Fig. 10
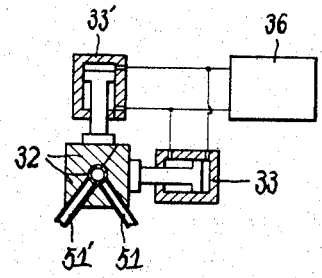
Fig. 12
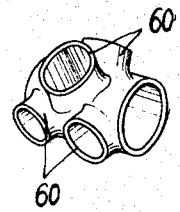
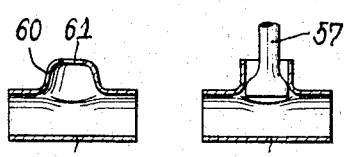
Fig. 13a   Fig. 13b
INVENTOR
Takashi Ogura et al
Terumori Ueda
BY Kenichi Yamada
Ernest G. Montague
Attorney United States Patent Office 3,350,905
Patented Nov. 7, 1967

3,350,905
LIQUID PRESSURE BULGE
FORMING APPARATUS
Takashi Ogura and Terumori Ueda, Nagoya, and Keiichi Yasuda, Numazu-shi, Shizuoka-ken, Japan, assignors to Agency of Industrial Science and Technology, Tokyo, Japan, a corporation of Japan
Filed Sept. 4, 1964, Ser. No. 394,489
Claims priority, application Japan, Dec. 21, 1963, 38/68,606, 38/68,607
11 Claims. (Cl. 72—28)

ABSTRACT OF THE DISCLOSURE

A liquid bulge forming device comprising a split die having at least two separate members and forming a die cavity complementary to and holding an open ended pipe therein and defining a recess complementary to the bulge to be produced in the pipe. Piston rods are aligned adjacent the ends of the pipe within the die cavity and adapted to seal compressively the open ends of the pipe and means are provided for supplying a liquid to the piston rods for causing the piston rods to press against the pipe, and means for causing the piston rods to move synchronously at the same speed. The piston rods are formed with a passage communicating with the pipe and a pump is provided for supplying a high pressure liquid to the passage and into the pipe causing the pipe to expand adjacent and into the recess in said split die, in a bulge expanding step, and a pressure regulating means for controlling the pump means in response to the distance of travel of the piston rods during the bulge expanding step for preventing an excessive bulge forming pressure, and a pressure balancing means for providing a second liquid pressure caused by the piston rod opposing the force on the piston rods and responsive to high pressure liquid in the pipe and controlled by the pump for maintaining the piston rods sealingly against the open ends of the pipe during the bulge expanding step.

---

The present invention relates to a liquid pressure bulge forming apparatus for a metal working process.

The most popular metal working process has long been press work utilizing a rigid die punch combination.

Recently, however, attempts have been successfully made to replace either a rigid die or a rigid punch with a rubber membrane backed up by liquid or with liquid alone, in order to form parts with irregular and intricate shapes. Outstanding features common to these newly developed methods employing this so-called "flexible die" or "flexible punch" are a considerable reduction in tool setting time and an improved quality product.

It is one object of the present invention to provide a flexible tool method in which the liquid has the ability to flow and the incompressibility required of a flexible tool; and more particularly, a cold forming process wherein a piece of metal pipe is fitted into a cylindrical die having a cavity, corresponding to the form desired and is internally exposed to an extremely high liquid pressure, which forces the pipe wall to fill the die cavity.

The present invention thus features the ability to cold form shapes that have hitherto been impossible to form with the conventional rigid tool apparatus.

It is another object of the present invention to provide a novel bulge forming process in which machinery parts, for example, various types of pipe-joints, which have been impossible to form with the conventional rigid tool set up, can be efficiently produced at a low cost.

With these and other objects in view which will become apparent in the following detailed description, the present invention will be clearly understood in connection with the accompanying drawings, in which:

FIGURES 1a and 1b are front and side views, respectively, of a pipe to be formed;

FIG. 2 is a cross-sectional view of one embodiment in accordance with the present invention;

FIG. 3a, 3b and 3c are axial sectional views of three examples for sealing pipe ends;

FIG. 4 shows an inlet construction for an extreme high pressure liquid;

FIGS. 5a and 5b are front and sectional views, respectively, of a bulged portion appearing on the processed pipe;

FIG. 6 is a cross-sectional view of a product having T-shape joints;

FIG. 7 is an illustration of a regulating method of a bulged end portion;

FIG. 10 is a section along the lines A—A of FIG. 9;

FIG. 11 is a section along the lines B—B of FIG. 9;

FIG. 12 is a perspective view of an embodiment in accordance with the present inevntion; and FIGS. 13a and 13b are sectional views of two bulged ends.

Figure 8:
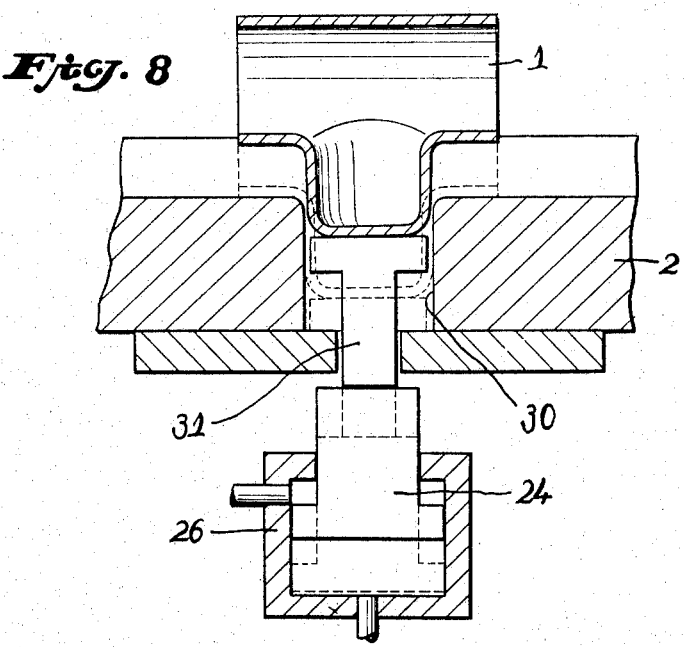
FIG. 8 is a sectional view of a knock-out process with reference to FIG. 7.

Now referring to the drawings, and more particularly to FIGS. 1a, 1b and 2, a length of pipe 1 cut to a proper length having a polished surface is located in a split die 2 and 2' which is pressed down by a piston 3.

By conducting a liquid pressure through a pump 6 into packing cylinders 5 and 5', pistons 8 and 8' move to a central position at an identical speed so that piston rods 4 and 4' connected with pistons 8 and 8' contact the respective ends of the pipe 1 whereby the ends of the pipe 1 are accordingly sealed.

Means are provided for regulating the synchonous movement of the pistons 8 and 8' comprising a linking construction consisting of racks 13 and 13', respectively, connected to pistons 4 and 4', respectively, and a pinion 14 which, is arranged to mesh with both racks 13 and 13'.

Along with the forward movement of the pistons 8 and 8', the piston rods 4 and 4' are moved forwardly and the pinion 14 is rotated by the racks 13 and 13' connected to the piston rods 4 and 4'. However, the movement of both racks 13 and 13' are properly regulated as the center of the pinion 14 is secured, and therefore, synchronous movement is achieved for the piston rods 4 and 4' which are connected to the racks 13 and 13'.

The pressure to be applied for the present invention should be such that the contacting force of the piston rods 4 and 4' is higher than the pressure of the liquid conducted to the pipe 1. At the same time, such a pressure force should be controlled so that the pipe is not deformed by an excessive pressure force.

FIGS. 3a and 3b illustrate the sealing of the pipe ends showing various examples; namely the ends of piston rods 4 and 4' have a sharp-cut circumferential frustoconical annular portion which contacts an annular circumference of the pipe-ends (FIG. 3a); the ends of the piston rods 4 and 4' have a conically formed portion which is inserted into the opening provided in the pipe-ends (FIG. 3b); the ends of piston rods 4 and 4' have a particular shape designed with an insertion member conically formed together with a sharp-cut projecting circumferential edge which is closely inserted into the opening in the pipe-ends.

A liquid is supplied from a low-pressure pump 7 through an extremely high pressure liquid passage 9 provided in pressure piston 8, joint-cylinder 10 and check valve 15 into and filling the pipe 1 so that any existing air within the pipe 1 is forced out through an extremely high pressure liquid passage 9' whereby a complete replacement of the air by the liquid can be accomplished under the control of a check valve 16.

In order to expedite this liquid replacement, the construction illustrated in FIG. 4, may be provided in which the opening of the extremely high pressure liquid passage 9' is slightly above the central part thereof so as to be able to drive rapidly the residual air out of the pipe 1.

Further, the aforementioned liquid supply is automatically regulated through the use of a time switch (not shown) which closes the pilot check valve 16.

In order to prevent damage in the contacting area between the piston rods 4 and 4' and the pipe 1, an extremely high pressure is provided at the pipe 1 through a pump 21 and pressure multiplier or compressor 11. Also a device herein called a "pressure balancing regulator" is utilized which device is designed such that the pipe 1 is always held in a proper position by generating the necessary force in an outer direction in the pressure pistons 8 and 8' by supplying an extremely high pressure liquid into pressure pistons 18 and 18' through a balancing cylinder 17. Accordingly, the high pressure liquid is safely supplied into the pipe 1 without damaging the sealing portion.

That is if the high pressure liquid which is supplied from the pump 21 through the compressor 11 fills the pipe 1, the high pressure liquid acts on the respective surface ends of the piston rods 4 and 4' with a force in the outer direction. Where the pressure force of the high pressure liquid becomes higher than the pressure force of the pressure cylinders 18 and 18', the contacting area between the piston rods 4 and 4' and the pipe 1 releases. In order to prevent such release, the pressure balancing regulator maintains a balance between the outer pressure force of the piston rods 4 and 4' and the internal pressure of the pressure cylinders 18 and 18' by supplying the high pressure liquid to the balancing cylinder 17 comprising a piston and a rod having proper diameters.

Accordingly the high pressure liquid from pump 21 may be supplied into the pipe 1 without releasing the sealing portion thereof.

The pipe 1 can be now satisfactorily formed to any shape by means of the high pressure liquid and compression thereof supplied from the pump 6 through pressure pistons 18 and 18' and packing cylinders 5 and 5'. In the bulge forming process, by supplying the pressure liquid from the pump 6 to the pressure cylinders 18 and 18' and the packing cylinders 5 and 5', the pipe 1 is compressed in an axial direction shown in FIG. 5 whereby the pipe 1 can be satisfactorily formed by means of the high pressure liquid in the pipe 1 and the compression of the packing cylinders 5 and 5' and the pressure cylinders 18 and 18'. In the bulge forming process, the liquid pressure pipe 1 is increased depending upon the difference between the cubic volume of the bulge portion and the compressed capacity of the pipe. If such a pressure excessively increases over a certain value, the bulge portion will be destroyed.

Accordingly, it is necessary to regulate the aforementioned pressure increase within limits depending upon size, quality etc. of the pipe required to be formed. In order to regulate the pressure, a regulating valve 19 and a cam 20 are provided. The cam 20 is connected with the piston rod 4 and has an inclined surface 27 having a constant relation with the compressive force of the pipe 1.

A follower wheel 28 contacts the inclined surface 27 and operates the pressure regulating valve 19 such that the pressure in the pump 21 (which may be called the first pressure) is properly controlled.

Consequently, the high liquid pressure generated within the pipe 1 (which may be called the second pressure) can be thus regulated.

Through the above-mentioned process, the pipe 1 is properly bulged by means of a die cavity 30 (FIG. 2) provided on the lower die 2 as illustrated in FIGS. 5a and 5b. A shape similar to a semi-sphere is formed at the bulged end, being swelled to a height corresponding to the amount of pressure applied.

To form a T-shape joint as illustrated in FIG. 6, the bulge forming process for providing the semi-spherical end as illustrated in FIG. 5 would not be necessary. Instead a limit means or supporting rod 31 (FIG. 7) having a flat contacting wall on the top thereof transversely movable in the die cavity 30 may be used, especially where a straight bulge formation is required. Further, with the supporting rod 31, the bursting pressure limit is increased, which permits an operative process with a relatively higher liquid pressure.

After the completion of this bulge forming process, the product is removed. The piston rods 4 and 4' are moved backwardly by conducting the liquid pressure produced by the pump 6 to the forward inlet of packing cylinders 5 and 5' (FIG. 2). Simultaneously, the knockout piston 24 is raised by the liquid pressure supplied by the pump 25, after the upper die 2' is elevated, which is effected by liquid pressure from pump 23 to the lower inlet of the die clamping cylinder 22. The product can then be removed, as illustrated in FIG. 8, from the lower die 2.

Figure 9:
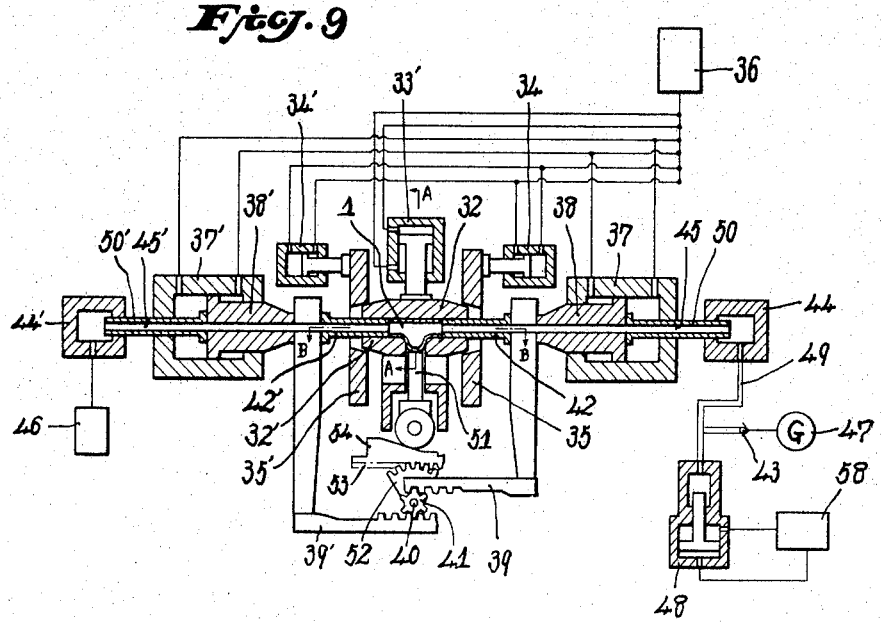
FIG. 9 is a sectional view of another embodiment of the present invention.

A further embodiment in accordance with the present invention will now be described. FIG. 9 shows the pipe 1 inserted in a three-part split die 32 and 32', which is tightened by clamping presses 33 and 33' operated by the liquid pressure supplied by a pump 36. Then, clamping presses 34 and 34', also operated by liquid pressure supplied by pump 36, push clamping rings 35 and 35', each having an inclined annular hole so that the inclined annular holes of the clamping rings 35 and 35' can be tightened and fitted around a corresponding sloping portion provided on both ends of the split-die 32 and 32'.

The liquid pressure supplied to pressure cylinders 37 and 37' from the pump 36 causes pistons 38 and 38' to press piston rods 42 and 42' on both ends of the pipe 1. A pinion 41 rotates around pin 40 and meshes with racks 39 and 39' which are connected to pressure pistons 38 and 38', respectively.

The compressive force produced in accordance with the aforementioned process always is required to be less than the pressure force required to excessively deform the pipe 1.

Further, the ends of the piston rods 42 and 42' may be formed as illustrated in FIG. 3.

A liquid is supplied from pump 47 through a check valve 43, into a reaction offset cylinder 44, and through an extremely high pressure conducting passage 45 provided in the pressure piston 38, and finally into the pipe 1. Due to an extremely high pressure conducting passage 45' provided in the pressure piston 38', a reaction offset cylinder 44' and a high pressure pilot check valve 46, the existing air within the aforementioned passageway is entirely forced out by the liquid supplied from the pump 47.

In this case, the construction as illustrated in FIG. 4 is advantageous for effecting a faster exhaustion. The termination of the liquid supplying operation is regulated under the control of the extremely high pressure pilot check valve 46 which is automatically shut off by a time switch (not shown).

Then, a high pressure liquid is supplied into the pipe 1 from the pump 58 through a compressor 48, a high pressure pipe 49, a reaction offset cylinder 44 and the extremely high pressure conducting passage 45.

Thereupon, a reverse force is, however, generated at both ends of piston rods 42 and 42'. The reverse force can be properly balanced and controlled by the reaction offset cylinders 44 and 44' in which are provided pistons 50 and 50' having an outer diameter equal to the inner diameter of the pipe 1 so that the two pushing forces generated from the high pressure liquids are maintained in a balanced state.

Further, the reaction offset cylinders 44 and 44' may be substituted by a flexible joint against a high pressure liquid, particularly when piston rods 42 and 42' slide transversely.

Now, if the high pressure liquid is conducted into the pipe 1, the pipe 1 gradually deforms within a die cavity 59 forming a bulged portion 60 thereof, firstly, as a semi-spherical body. Secondly, when the pressure of pressure cylinders 37 and 37' is so increased as to exceed an oil tight pressure, the pipe 1 is accordingly pressed axially and the product can be thus provided. Consequently, the present process is always controlled with a relationship between the compressive length of the pipe 1 and the inside liquid pressure thereof.

An appropriate value of the liquid pressure can be calculated from the corresponding diameter of the bulged portions 60. As illustrated in FIG. 12, there are four portions to be bulged having different diameters, respectively, and the pressure for the present process requires that the pressure corresponds with the biggest diameter.

In order to eliminate the aforementioned inconvenience, stoppers 51 and 51' are provided in the die cavity 32', as illustrated in FIG. 10, to push up the bulged portion having the biggest diameter.

With the ends of the bulged portion supported by stoppers 51 and 51', the larger bulged portions are allowed to develop only in a predetermined relation to the advance of the compressing pistons, eliminating any possibility of an early rupture of the material.

The structural mechanism for performing the aforementioned process is shown in FIG. 9 and consists of a pinion 41 rotatably fitted to a pin 40 being regulated by the movement of the racks 39 and 39' connected with pressure pistons 38 and 38', and a cam plate 54 having a rack 53 arranged to mesh with a segment 52 secured to the pin 4, and stoppers 51 and 51', which are rotatable on the cam plate 54. The shape of the cam plate 54 is formed so that stoppers 51 and 51' can be moved backwardly in relation to a constant value of the compressive volume. Now, if pistons 38 and 38' are moved in the approaching or closer direction, respectively, racks 39 and 39' connected with the pistons 38 and 38' cause the pinion 41 to rotate. The rotation of the pinion 41 causes the segment 52, which is secured to the same axis, to rotate and the stopper 51 is moved backwardly as the cam plate 54 is controlled by the rack 53 which meshes with the segment 52. Thus, the most efficient bulge formation 60 can be provided through a liquid pressure necessary only for forming the smallest bulge.

In the next stage, an opening 61 is provided on the tip end of bulge formation 60 as illustrated in FIG. 13a.

Then punches 57 and 57' provided on the tip end of the punching press 56, as illustrated in FIG. 11 and FIG. 13b penetrate into the front end of the smaller bulge by utilizing the liquid pressure from a pump 62 while the extreme high pressure liquid exists within the pipe 1.

The products formed in accordance with the above mentioned process are removed from the split die 32 through a reaction of the stopper 51, being effected by a backward movement of pressure pistons 38 and 38'.

While we have disclosed several embodiments of the present invention, it is to be understood that these embodiments are given by example only and not in a limiting sense, the scope of the present invention being determined by the objects and the claims.

What we claim is:

1. A liquid bulge forming device comprising
a split die comprising at least two separate members and forming a die cavity complementary to and holding an open ended pipe therein and defining a recess complementary to the bulge to be produced in said pipe,
piston rods aligned adjacent the ends of the pipe within said die cavity and adapted to seal compressively the open ends of said pipe,
means for supplying a liquid pressure to said piston rods for causing said piston rods to press against said pipe sealingly,
means for causing said piston rods to move synchronously at the same speed,
said piston rods formed with a passage therein communicating with the ends of said pipe,
pump means for supplying a high pressure liquid to said passage and into said pipe causing said pipe to expand adjacent and into said recess in said split die, in a bulge expanding step,
a pressure regulating means for controlling said pump means in response to the distance of travel of said piston rods during said bulge expanding step for preventing an excessive bulge forming pressure,
a pressure balancing means for providing a second liquid pressure on said piston rods opposing the force on said piston rods caused by said high pressure liquid in said pipe and responsive to and controlled by said pump means for maintaining said piston rods sealingly against the ends of said pipe during the bulge expanding step, and
a limit means adjacent said recess for preventing rupture of the bulge being formed on said pipe during said bulge expanding step.

2. The device, as set forth in claim 1, wherein the ends of said piston rods adjacent the open ends of said pipe are formed with a sharp-cut circumferential annular portion adapted for sealingly abutting the circumference of said open ends of said pipe.

3. The device, as set forth in claim 1, wherein said ends of said piston rods adjacent the open ends of said pipe are formed with a conical portion adapted for tight and sealing insertion into the open ends of said pipe.

4. The device, as set forth in claim 1, wherein the ends of said piston rods adjacent the open ends of said pipe are formed with a sharp-cut projecting circumferential edge together with a central insertion portion adapted to be inserted into the open end of said pipe, and said sharp-cut projecting circumferential edge adapted for sealingly abutting the circumference of said ends of said pipe when said central insertion portion is inserted into said end of said pipe.

5. The device, as set forth in claim 1, wherein said piston rod defines an opening at one end thereof positioned slightly above the axis thereof, and said opening communicating said passage with said pipe.

6. The device, as set forth in claim 1, wherein said pressure balancing means comprises a balancing cylinder connected in liquid communication between and with said piston rod and said pump means, and the diameter thereof is adapted to provide a proper liquid pressure ratio for said sealing during said bulge expanding step.

7. The device, as set forth in claim 1, wherein said pressure balancing means comprises a reaction offset cylinder and a piston disposed for movement therein, said piston is rigidly connected to said piston rod, the outer diameter of said piston is equal to the diameter of said pipe to be formed, said passage further extending through said piston, and said pump means supplying said high pressure liquid to said reaction offset cylinder, thereby causing forces generated by said high pressure liquid on said piston rod to be in a balanced state.

8. The device, as set forth in claim 1, wherein said pressure regulating means includes a cam surface connected to said piston rods for movement therewith and a pressure regulating valve including a follower wheel contacting said cam surface, said pressure regulating valve operatively connected to said pump means, and said cam surface adapted to have a constant relationship with the compressed length of said pipe during said bulge expansion step.

9. The device, as set forth in claim 1, wherein said synchronizing means comprises a rack connected to each piston rod and a pinion gearing simultaneously with said racks.

10. The device, as set forth in claim 1, wherein said limit means comprises a knock-out piston movably disposed in said recess adjacent said bulge to be formed and a knock-out piston cylinder in which said knock-out piston is operatively disposed for removing products from said die cavity.

11. The device, as set forth in claim 1, wherein said limit means comprises a stopper movably disposed in said recess adjacent said bulge to be formed and means operatively connected to and responsive to the compressed length of said pipe during said bulge expanding step and operatively connected to and controlling said stopper for moving said stopper outwardly in a constant relationship to the compressed length of said pipe.

References Cited
UNITED STATES PATENTS

| | | | |
|---|---|---|---|
| 326,611 | 9/1885 | Whitney | 72—61 |
| 1,886,831 | 11/1932 | Murray | 72—58 |
| 2,199,830 | 5/1940 | Cornell | 72—60 |
| 2,203,868 | 6/1940 | Gray et al. | 72—354 |
| 2,748,455 | 6/1956 | Draper et al. | 72—61 |
| 2,902,962 | 9/1959 | Gravin | 72—61 |
| 3,072,085 | 1/1963 | Landis | 72—61 |

RICHARD J. HERBST, *Primary Examiner.*